United States Patent [19]

Jaffe

[11] 3,730,955

[45] May 1, 1973

[54] DIANTHRAPYRIMIDINE YELLOW

[75] Inventor: Edward E. Jaffe, Union, N.J.

[73] Assignee: E. I. du Pont de Nemours and Company, Wilmington, Del.

[22] Filed: Sept. 10, 1971

[21] Appl. No.: 179,591

[52] U.S. Cl. ........260/256.4 Q, 260/40 R, 106/288 Q
[51] Int. Cl. .............................................C07d 51/48
[58] Field of Search................................260/256.4 Q

[56] References Cited

UNITED STATES PATENTS 2,697,097  12/1954  Ebel et al. ..........................260/256.4

Primary Examiner—Alex Mazel
Assistant Examiner—R. V. Rush
Attorney—Donald A. Hoes

[57] ABSTRACT

Dianthrapyrimidine, a yellow pigment suitable for use in finishes, especially automotive finishes.

1 Claim, No Drawings

DIANTHRAPYRIMIDINE YELLOW

BACKGROUND OF THE INVENTION

A yellow pigment of the prior art known as anthrapyrimidine yellow is used to a considerable extent in automotive finishes and it shows relatively satisfactory physical properties in terms of chemical resistivity, bleed resistance, strength, and lightfastness.

SUMMARY OF THE INVENTION

In accordance with the invention there is prepared the compound dianthrapyrimidine yellow. It has the structural formula (I):

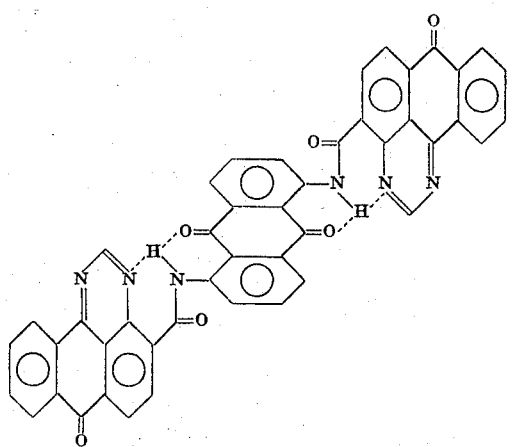

(I)

($C_{46}H_{22}N_6O_6$ — molecular weight 754) and is prepared by treating anthra (1,9)-pyrimid-7-one-4-carboxylic acid

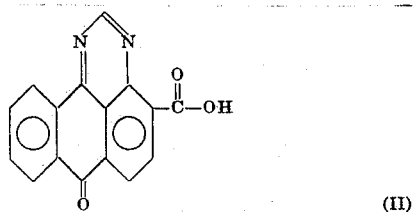

(II)

with thionyl chloride to form anthra-(1,9)-pyrimid-7-one-4-carbonyl chloride

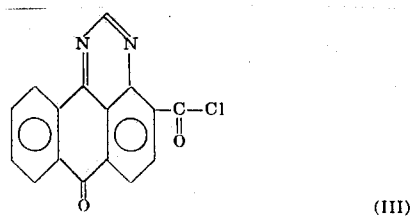

(III)

(molecular weight = 294.5)
and then, in dry nitrobenzene, further reacting the latter chloride with 1,5-diaminoanthraquinone.

The compound I, which is referred to herein as dianthrapyrimidine yellow, is well suited for use as a pigment owing to excellent physical properties. It is, in comparison with the known pigment anthrapyrimidine yellow, particularly outstanding as regards strength and bleed resistance.

The following detailed example, in which parts and percentages are by weight, illustrates the production and use of dianthrapyrimidine yellow.

EXAMPLE

A. Preparation of Anthra (1,9)-pyrimid-7-one-4 carbonyl chloride (III)

A suspension of 48 grams of the compound II in 250 ml of thionyl chloride is stirred and refluxed for 1.5 hours in a round bottom flask, while protected from moisture by a $CaCl_2$ drying tube. At the conclusion of this reflux period, 70 ml. of thionyl chloride is distilled off and the reaction mixture is cooled to 10°C. The acid chloride product is separated by filtration and is washed on the funnel with petroleum ether. The resulting compound III is air dried. Its weight is 41.5 grams, representing an 81.3 percent yield.

B. Preparation of Compound I in Crude Form

Eleven and nine-tenth grams (0.05 mole) of 1,5-diaminoanthraquinone are slurried in 500 ml. of dry nitrobenzene and heated to 100°C. To this slurry is added 32.4 grams (0.11 mole) of compound III and the mixture gradually heated to 155°-165°C. over a period of 45 minutes, followed by continued heating at this temperature for 4 hours. The resulting compound I so formed is filtered hot and washed successively with nitrobenzene, benzene, and alcohol. The yield of dianthrapyrimidine yellow in crude form is 35.3 grams or 93.6 percent.

C. Purification of Compound I

The 35.3 grams of crude dianthrapyrimidine $H_{is\ ex}$-tracted with 800 ml nitrobenzene at 190°C. and then with one liter of nitrobenzene at the boil to yield 34.4 grams of recovered pigment. Of this, 29 grams is pulverized and free of dissolved in 290 grams of concentrated $H_2SO_4$ at 8°-10°C. While maintaining this temperature the acid solution is reduced to 85 percent acid by slow addition of water. The resulting slurry of the sulfate is stirred for one hour while maintaining the temperature at 8°-10°C. The solid is recovered by filtration, washed with 70% $H_2SO_4$ and decomposed with ice and water. The resulting yellow solid is filtered and washed with water until free of acid. This is then extracted successively twice with 500 ml of boiling nitrobenzene and once with 500 ml of boiling dimethylformamide to give 12.8 grams of purified product. Heated to a temperature of 400°C., the product does not melt.

Analysis of the product shows for $C_{46}H_{22}N_6O_6$ (molecular weight 754)

| Calculated | Found |
|---|---|
| C — 73.20 | C — 73.02 |
| H — 2.92 | H — 2.93 |
| N — 11.14 | N — 11.10 |

D. Particle Size Reduction of Compound I

The purified product of Part C is dispersion milled for three days in the laboratory according to the process described in U.S. Pat. No. 3,030,370 using aluminum sulfate and perchloroethylene. The mill powder is extracted in the conventional manner using 5 ml of $H_2SO_4$ per liter of water, for 1 hour at 85° to 90°C. The pigment is filtered, washed acid-free and finally baked with 10 percent nickel carbonate.

E. Utility in Enamel Compositions

Both the dispersion-milled product of Part D and the crude product of Part B are used to prepare thermosetting acrylic enamel compositions.

Twelve parts of each dianthrapyrimidine yellow pigment is dispersed in an acrylic resin by grinding in a 1-pint glass jar containing 30 parts of a thermosetting acrylic resin solution (containing 50 percent hydroxyl-substituted polymethylmethacrylate), 58 parts of a solvent composed of 75 percent xylene and 25 percent Solvesso (a petroleum hydrocarbon solvent sold by Enjay Chemical Co.), and 400 parts of steel shot. After 48 hours of grinding by rotating the sealed jar, 48.0 additional parts of the thermosetting acrylic resin solution and 18.0 additional parts of the xylene-Solvesso mixed solvent are added, and the sealed jar rolled for an additional 20–30 minutes. At this time, 34.0 additional parts of the resin solution and 40.0 parts of melamine-formaldehyde solution (containing 60 percent non-volatiles) are added as a cross-linking agent, and the material is thoroughly mixed. The coating compositions obtained, after straining to remove the steel shot, have a pigment-to-binder ratio of 0.15, and contain 5 percent pigment and 33.3 percent binder by weight based on the final paint. The ratio of resin to cross-linking agent is 70/30.

These coating compositions are compared with acrylic enamel prepared in the same manner using commercially-available anthrapyrimidine yellow as the pigment. The crude dianthrapyrimidine yellow is stronger than the anthrapyrimidine yellow. The dispersion milled dianthrapyrimidine yellow is darker, more transparent in masstone, shows substantially more two-tone effect when used with metallics, and is estimated to be at least twice the strength and considerably more intense than the prior art anthrapyrimidine yellow. Both the crude and the dispersion-milled products are comparable to the anthrapyrimidine yellow in durability and superior in terms of resistance to bleed.

It will be understood that it is also possible to prepare the acid chloride in nitrobenzene with excess thionyl chloride at about 70°C., followed by allowing excess thionyl chloride to distill off under vacuum with or without distillation of some of the solvent. When all excess acid chloride is removed, the warm solution of the acid chloride in nitrobenzene can be treated with the diamine and the process completed as shown in the Example, Part B. This process does not require the isolation of solid acid chloride.

In any case, the reaction can be run in any solvent which will not hydrolyze the acid chloride and which boils sufficiently high to allow the reaction to proceed at a reasonable rate. Such solvents include chlorobenzene, p-dichlorobenzene, mentylene, chloronaphthalene, etc. In some cases the formation of the amide is catalyzed by bases such as pyridine or dimethyl formamide.

The durability of the dianthrapyrimidine yellow pigment was demonstrated in thermosetting enamels but it is equally useful in thermoplastic lacquer or alkyd systems. Its bleed resistance makes it particularly useful for pigmentation of plastic materials.

Although an extensive purification of the dianthrapyrimidine yellow was undertaken in the foregoing example, the crude product can be used directly with only a slight sacrifice in intensity.

Particle size reduction was carried out by dispersion milling but other methods, such as milling with dry salt, milling with high speed revolving disc (Hochberg finishing), high turbulence drowning from sulfuric acid solution are also useful methods of particle size reduction.

Although in the example given above for the preparation of the dianthrapyrimidine yellow of this invention, unsubstituted 1,5-diaminoanthraquine was used in the aroylation reaction of step B, substituted 1,5-diaminoanthraquinones can be similarly used. Among these are, for example, 1,5-diamino-2,6-dimethylanthraquinone and 1,5-diamino-2,6-dichloroanthraquinone, as well as other symmetrical compounds such as 3,7- and 4,8-dimethyl- dichloro- and dialkoxy-diaminoanthraquinones. As would be expected, the use of substituted diamino-compounds results in a shift in color in the pigment product.

What is claimed is:

1. Dianthrapyrimidine yellow of the formula

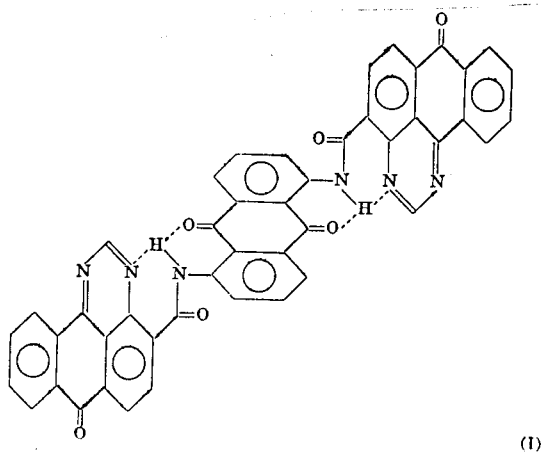

(I)